Figure 1:
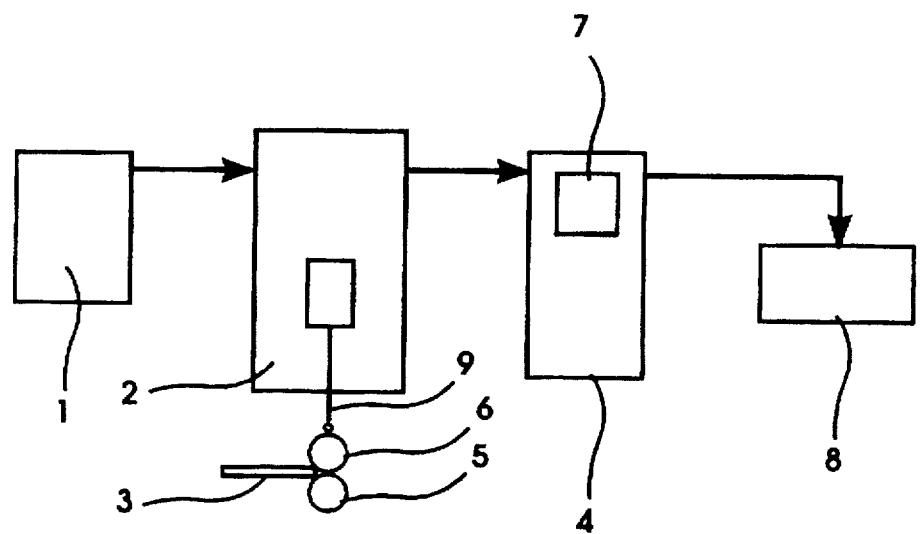

United States Patent [19]

Elbling

[11] Patent Number: 5,712,804
[45] Date of Patent: Jan. 27, 1998

[54] DIGITAL SHEET-THICKNESS MEASURING APPARATUS

[75] Inventor: Joseph Elbling, Porto Alegre, Brazil

[73] Assignee: Perto S.A., Gravatai, Brazil

[21] Appl. No.: 588,723

[22] Filed: Jan. 19, 1996

[30] Foreign Application Priority Data

Jan. 20, 1995 [FR] France ................ 95 00628

[51] Int. Cl.$^6$ .............. G01B 7/06; G01B 11/06
[52] U.S. Cl. ............. 364/563; 271/262; 271/264; 271/265.01
[58] Field of Search ............ 271/263, 262–277, 271/DIG. 2; 324/229, 230, 225; 340/657, 660, 674; 364/563, 557; 73/862.69, DIG. 2; 331/1 A, 17, 25

[56] References Cited

U.S. PATENT DOCUMENTS

| 4,550,252 | 10/1985 | Tee | 250/223 |
|---|---|---|---|
| 4,559,452 | 12/1985 | Igaki et al. | 250/560 |
| 4,715,007 | 12/1987 | Fujita et al. | 364/563 |
| 4,753,433 | 6/1988 | Rodi et al. | 271/263 |
| 4,836,528 | 6/1989 | Geiser | 271/263 |
| 5,011,128 | 4/1991 | Tsuji | 271/263 |
| 5,075,622 | 12/1991 | Konii et al. | 324/229 |

FOREIGN PATENT DOCUMENTS

| 0 064 523 | 11/1981 | European Pat. Off. |
| 0 170 341 | 1/1985 | European Pat. Off. |
| 29 16 096 | 4/1979 | Germany |
| 1344986 | 6/1970 | United Kingdom |
| 1497181 | 5/1975 | United Kingdom |
| 2 218 524 | 11/1989 | United Kingdom |
| WO82/01698 | 5/1982 | WIPO |

OTHER PUBLICATIONS

The Soviet Journal of Nondestructive testing, vol.23, No. 7, Juillet 1987 New York, USA, pp. 467–471.
Patent Abstracts of Japan, Japanese Patent Application No. 56–112602.
Patent Abstracts of Japan, Japanese Patent Application No. 63–016215.

Primary Examiner—Emanuel T. Voeltz
Assistant Examiner—Kamini S. Shah
Attorney, Agent, or Firm—Lowe, Price, LeBlanc & Becker

[57] ABSTRACT

The invention concerns an apparatus for digitally measuring the thicknesses of sheets passing between a roller (5) fixed in position and a sensor roller (6) biased toward the fixed roller (5), said apparatus comprising a transducer (2) with at least one input winding, one output winding and with an element (17) sensitive to the position of the sensor roller (6), the transducer input being fed from an oscillator (1). A digital processing unit (4) is connected to the output of the transducer (2) and, on the basis of two measurements, one in the absence of a sheet and the other in the presence of a sheet, issues a digital value of the sheet thickness obtained from the subtraction of the said two measurements.

9 Claims, 3 Drawing Sheets

| SHEET | GAIN | V14 | V15 | $\frac{V14 - V15}{V14 + V15} \cdot K$ (K= 1000) | SHEET THICKNESS ($\mu$) |
|---|---|---|---|---|---|
| 0 | G | 101 | 99 | 10 | 0 |
| 1 | | 106 | 94 | 60 | 50 |
| 2 | | 111 | 89 | 110 | 100 |
| 0 | G/2 | 50,5 | 49,5 | 10 | 0 |
| 1 | | 53 | 47 | 60 | 50 |
| 2 | | 55,5 | 44,5 | 110 | 100 |

DIGITAL SHEET-THICKNESS MEASURING APPARATUS

The invention concerns an apparatus for digitally measuring sheet thickness and especially appropriate for dispensers of laminar objects such as documents or bank notes/money-bills. The apparatus of the invention is especially well suited to delivering sheets of different thicknesses and to distinguish the thickness of a single sheet from that of a stack of two or more sheets, for instance in automated teller equipment.

It is known from the UK patent A 1,344,986 to make use of an optical detector to detect the simultaneous passage of two bills, said detector being sensitive to the bill(s) opacity/opacities, however such an apparatus is fairly unreliable when the bills are greasy or dirty.

It is furthermore known to use a mechanical thickness detector which uses a roller of which the shaft is displaced when a bill is passing; in the event that several superposed bills are passing, the roller displacement actuates an electric switch.

The UK patent A 1,497,181 describes an apparatus controlling laminar materials using a sensor roller and a variable-reluctance transducer. In apparatus of this kind, the thickness of one sheet is defined by a predetermined threshold value and when that value is being exceeded, the apparatus puts out a signal that there are superposed sheets. Such apparatus incurs the drawback of long-term variation in the detection head or in the control circuits, whereby the threshold value varies.

This long-term variation may be caused by the relative mechanical motion of the pivot of an arm affixed to the roller shaft and the surface on which the sheet is placed. If the detector output is compared with a fixed threshold in the control-circuit output stages, measurement accuracy for the sheet shall be degraded. The dimensional stability required in the measurement of bill thickness, which is for instance 50 to 150 μ, will be difficult to ensure under reasonable conditions of manufacture and wear.

The European patent document A 0,064,523 describes the detection of superposed bills by using analog threshold values for a single bill and for two bills. An analogue circuit allows varying the reference value in the absence of a bill, without thereby changing the differences in threshold levels for zero bill and for 1 or 2 bills.

However this patent describes no means at all for automatically compensating transducer-gain variations.

These changes in gain arise from amplitude variations in the oscillator or in the transducer's amplifier circuit. Said variations modify the transducer signal, but not the reference values used to trigger the 1-bill and 2-bill thresholds. These gain variations will make the bills appear thinner or thicker, and consequently threshold values are reached with bills, or thicknesses, other than those desired.

The above cited patent manually adjusts a potentiometer to determine the reference values. Such adjustment requires skilled personnel, whereby setup and maintenance are more difficult, in particular when different-thickness sheets are used, illustratively with respect to automatic tellers issuing money bills of different countries (and of different thicknesses) at the same period, or machines issuing objects other than bills, for instance stamped envelopes, bank notes and lottery tickets.

The object of the present invention is to eliminate said drawbacks by not resorting to analogue techniques when measuring the thickness of bills.

The object of the invention is an apparatus digitally measuring the thickness of sheets passing between a roller fixed in place and a sensor roller biased toward the fixed roller, said apparatus comprising a transducer with at least one input winding, at least one output winding, and an element responding to the position of the sensor roller, the transducer input being fed by an oscillator, said apparatus being characterized in that, at the transducer output, it comprises a digital processing unit which digitally puts out a value representing the position of the position-responsive element relative to the transducer, and, based on two measurements, one of which is carried out in the absence of a sheet and the other in the presence of a sheet, said apparatus will subtract and digitally put out a value of the sheet thickness.

In other features of the invention:
- the transducer comprises an input winding and two output windings, the digital processing unit comprises a microprocessor and two analogue-digital converters each mounted between the output windings and the microprocessor,
- the transducer comprises two input windings and one output winding, one of the input windings being energized directly and the other input winding being energized through a multiplying digital-analogue converter in such a way as to cancel the output signal of the output winding,
- the multiplying coefficient of the multiplying digital-analogue converter is between 0 and 1, and it is regulated by a counter driven by a control unit receiving the output signal of the output winding, the sum displayed by the counter being increased when the output signal is positive and decreased when it is negative, and being stopped when it is zero,
- the two input windings are energized through a multiplexer in such a way that their feeds are exchanged in order to obtain a zero output signal,
- the two input windings and the output winding are in the form of relief printed circuits with a square waveform contour, said output winding constituting the responding element of the transducer,
- relative to the printed circuit of the output winding, the two printed circuits of the input windings are geometrically offset to create two spatial sine magnetic fields mutually phase shifted by 50°,
- the two printed circuits of the input windings generate a magnetic field of which the amplitude is proportional to their drive current,
- the laminar thickness thresholds are automatically determined by measuring the thickness of the first sheets of a new cassette.

Other features of the invention are elucidated in the following description relating to the attached drawings.

Figure 2:
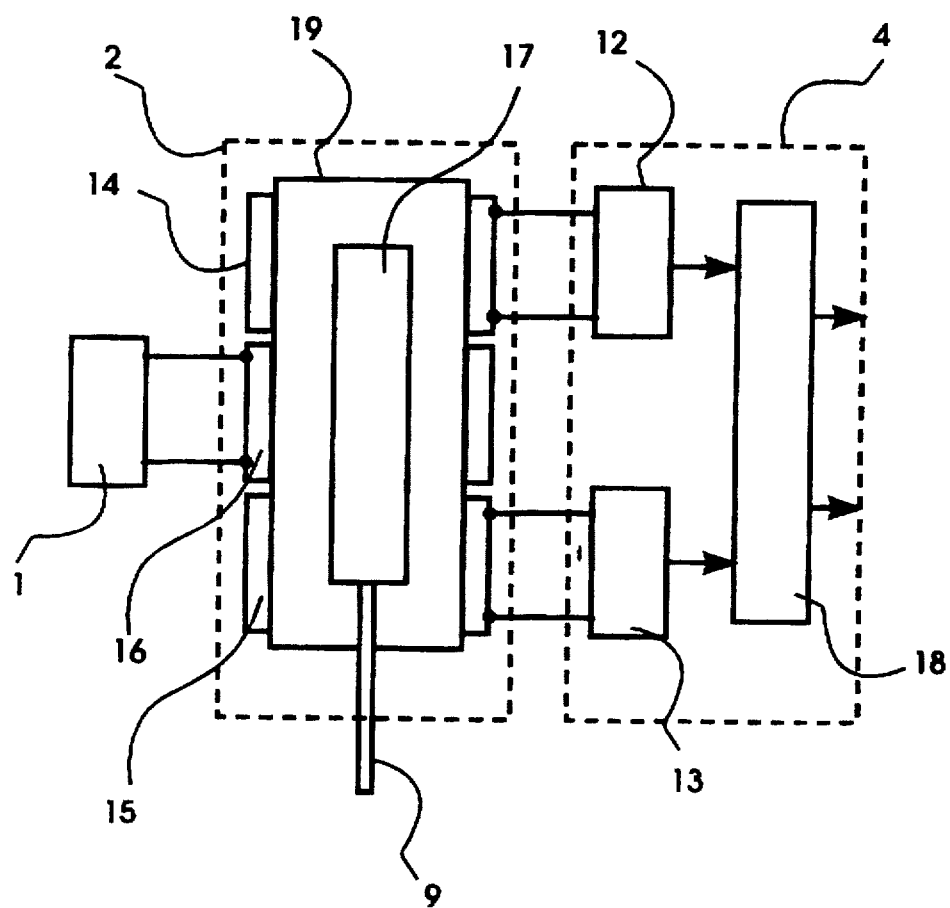
Figures 3, 5:
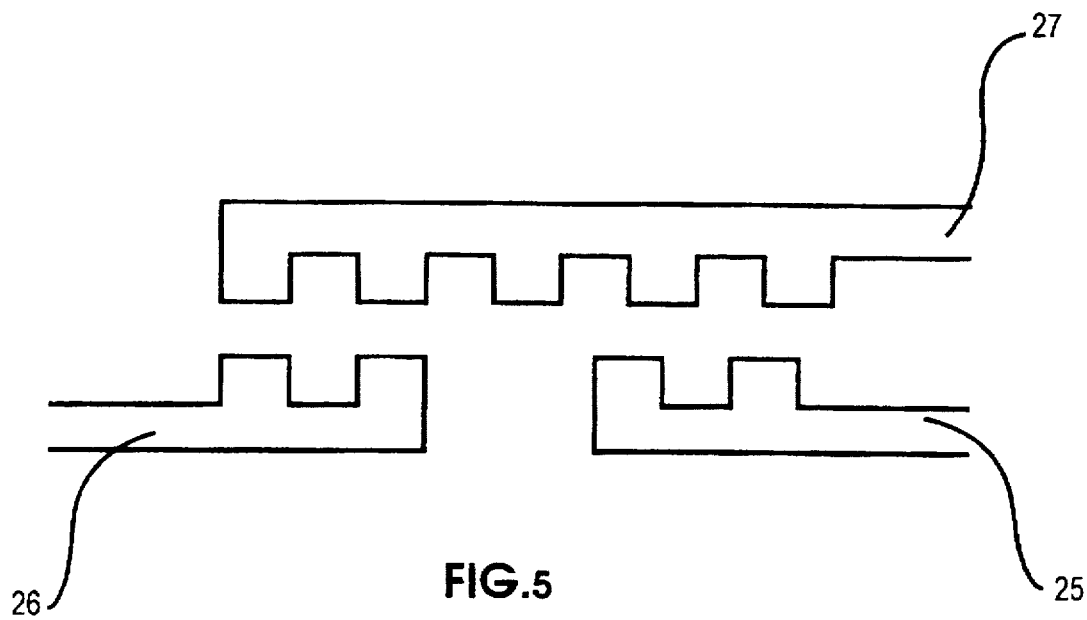
Figure 4:
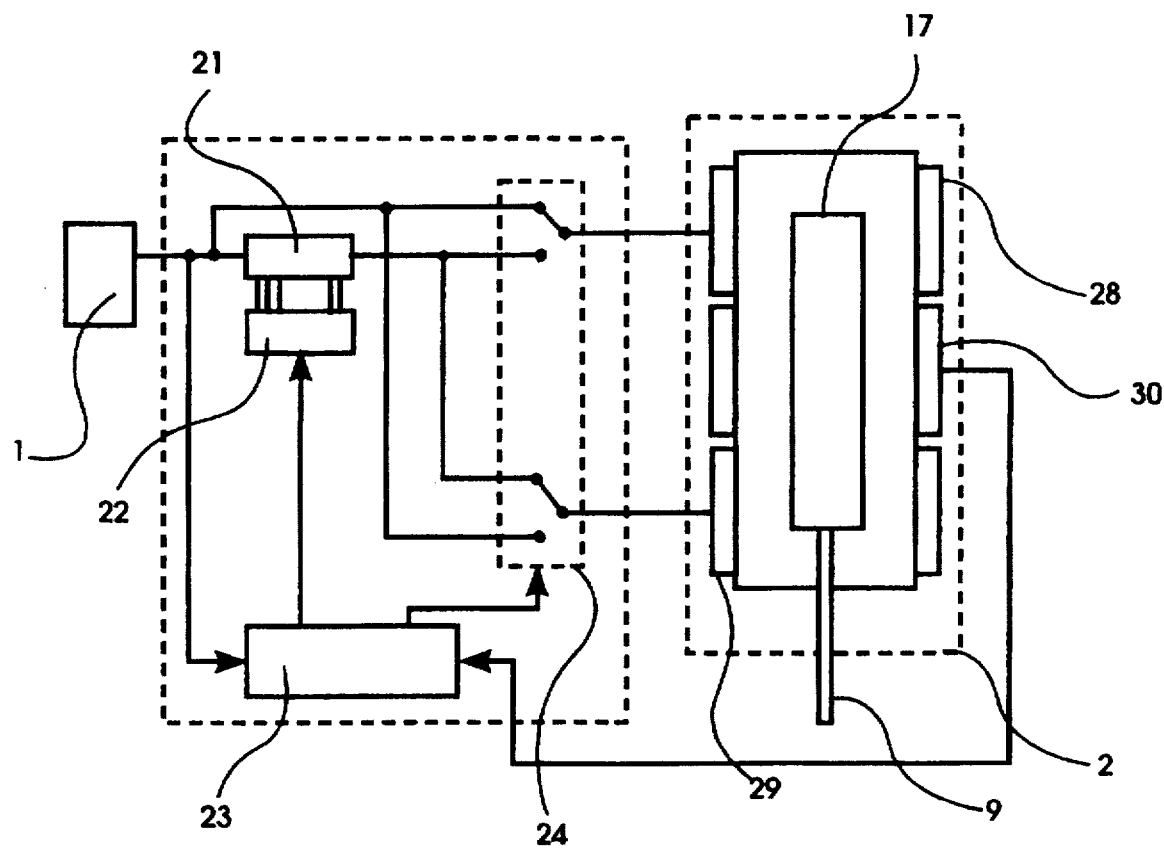

FIG. 1 is the block circuit diagram of the thickness-measuring apparatus of the invention, FIG. 2 is a first illustrative embodiment of the measuring apparatus of the invention, FIG. 3 is a table listing measurements taken at different gains, FIG. 4 is a second illustrative embodiment of the measuring apparatus of the invention, and FIG. 5 is simplified schematic of a third illustrative embodiment of the invention.

The present invention allows digitally measuring with high resolution the thickness of sheets or bills/tickets, for instance to one-hundredth of the sheet thickness. Contrasted with analogue measurement, digital measurement allows representing a sheet thickness by a number instead of a voltage.

It is easy to process a sheet thickness given in numerical form by computer digital techniques. For instance the numbers may be stored, averaged, divided, multiplied. Any number of sheets of different thicknesses can be measured at any time without resort to manual adjustment.

Thickness measurement precision is unaffected by reference variations in the absence of a sheet or by large variations in system gain.

In FIG. 1, a sheet 3 is fed to rollers 5 and 6. The roller 5 is fixed in the sense it cannot be displaced vertically. The sensor roller 6 is able to move vertically and is biased for instance by a spring toward the roller 5. The sensor roller 6 is displaced in relation to the thickness of the sheet 3 when between the rollers 5 and 6. The roller 6 displaces the shaft 9 of the transducer 2.

The transducer 2 receives the output of an oscillator 1 and its own output is fed to the transducer digital processing unit 4 consisting of analogue-digital converters and of a digital microprocessor.

Said unit 4 transforms the values from the sheet-number transducer 7 into any desired unit, for instance microns (µ). Most paper money in the world is between 50 and 150 µ thick.

The number representing the thickness of a bill is sent to the calculator 8 of the bill-issuing system. This calculator controls all bill delivery functions, for instance starting and stopping the feed motors, driving the bill-denying mechanisms, selection of the proper circuit delivering circuit inside the machine.

When several bills are detected, they may be denied or delivered and considered part of payment in (paper-money) bills.

Because it is able to calculate digitally and because of its storage function, the system calculator can calculate and store the magnitudes of sheet average-thicknesses.

These values may be used to automatically correct the threshold values for the purpose of detecting several sheets.

Many sheet-dispensing systems comprise cassettes from which the sheets are taken off. When the cassettes are replenished, one may measure the first sheets to be issued. The average of such measurements may then be used to determine the sheet-thickness threshold value.

This automatic determination of the threshold values is especially useful in systems issuing sheets of different thicknesses from different cassettes because admitting a cassette into any cassette-slot no matter what the thickness of the sheets in that cassette.

To make such operations possible, high resolution digital measurement of the sheet thickness is required rather than merely the detection of analogue detection of threshold crossing in the manner of the above cited documents.

FIG. 2 shows details of the transducer 2 and of the transducer digital processing unit 4 for a first embodiment.

The transducer 2 is composed of three windings on a hollow cylinder 19. The winding 16 is coiled around the cylinder and is linearly mounted at the center of said cylinder's longitudinal axis. The windings 14 and 15 are coiled on each side of the winding 16 whereby their particular centers are symmetrical with the center of the winding 16 on the longitudinal axis of the cylinder 19. The coupling core 17 is axially displaceable inside the hollow cylinder 19 and its length is approximately the distance between the centers of the windings 14 and 15. This coupling core 17 assures inductive coupling of the windings 14 and 16 as well as of the windings 15 and 16.

When the winding 16 is connected to the oscillator 1, the current through it generates a magnetic field coupling with the windings 14 and 15 in proportion to the position of the coupling core 17. This coupling in turn generates a voltage across the terminals of the windings 14 and 15 in proportion to the core position. This position is expressed as follows:

$$P17 = K\frac{V14 - V15}{V14 + V15} = K\frac{1 - V15/V14}{1 + V15/V14} \quad (1)$$

where P17 is the position of the core center relative to the center of the winding 16 (middle of the distance between the centers of the windings 14 and 15), V14 is the voltage across the terminals of the winding 14, V15 is the voltage across the terminals of the winding 15 and K is a constant converting the voltage ratios into a number representing the sheet thickness.

The position P17 for zero sheet is stored in the microprocessor 18. When a sheet is fed in-between the rollers 5 and 6, P17 is digitally calculated and subtracted from the above stored P17 value for zero sheet. The sheet thickness is the result of this digital subtraction.

The sheet thickness is independent of changes in gain. Changes in gain may arise from oscillator or amplifier variations and entail variations in output voltage at constant transducer-core displacement. In the present invention, the independence from gain is illustrated in FIG. 3 showing the values for zero sheet, for one sheet and for two sheets, which are calculated using eq. 1 for two gain conditions, one being twice the other. This table shows that the measured thickness sheet is independent of gain.

In FIG. 2, the analogue-digital converters 12 and 13 convert the analogue voltages of the windings 14 and 15 resp. into digital numbers. These converters also may be incorporated into the microprocessor 18. They must be appropriately selected for the particular application. Illustratively, if a displacement of 1 mm and a resolution of 1 µ are required, then a 10 bit (division by 1,024) A/D converter must be used.

In another embodiment of the invention, the position of the coupling core 17 is ascertained using a different procedure using the same transducer. In the first procedure relating to FIG. 2, the winding 16 is energized by the oscillator 1 and generates voltages in the windings 14, 15, the values of these voltages depending on the position of the coupling core. These voltages are converted by the A/D converters 12 and 13 into numbers.

The numbers resulting from this conversion are then used to calculate the core position.

In the embodiment variation shown in FIG. 4, the oscillator 1 is connected to either of the windings 28 and 29 of the transducer 2 by a multiplexer 24 driven by the control unit 23 which in turn is fed by the output signal of the oscillator 1. Moreover the oscillator 1 is connected to a multiplying D/A (digital-analogue) converter (M DAC) 21 of which the output is connected through the multiplexer 24 to the other winding 29, 28 of the transducer. The winding 30 is connected by its output to the control unit 23 on one hand driving the multiplexer 24 and on the other hand driving a counter 22 of which the output number is fed to the M DAC 21.

One of the windings 28, 29 is directly driven by the oscillator 1 whereas the other is driven by the output from the M DAC 21. This output corresponds to the signal from the oscillator 1 multiplied by the numerical value fed from the counter 22. This numerical value falls between 0 and 1.

For each core position and within the linearity range of the transducer 2, there is one current ratio for the two transducer windings 28, 29 which results in zero output at the winding 30. The output of the winding 30 is connected to the control unit 23 which carries out a synchronous demodulation. The control unit 23 drives the counter 22 in such manner that it will count up for a positive signal from the winding 30 and will count down when the signal is negative, and that it will stop if the signal is zero.

The position of the core 17 is described by the following equation for the case of a stopped counter:

$$P17 = K \frac{1-CR}{1+CR} \quad (2)$$

where P17 is the position of the core 17 relative to the center of the winding 30, CR is the number read on counter 22 when the control unit 23 stops the counter, that is when the center of the core 17 is in that position wherein the magnetic field generated by the current through the windings 28 and 29 is zero at the center of the winding 30, and K is a multiplication constant.

To ascertain a sheet thickness, the position P17 for zero sheet is subtracted from the position P17 when one or several sheets are present.

Be it borne in mind that the above described method varies the drive currents in the windings 28 and 29 in such manner that the resulting magnetic field at the center of the winding 30 is zero. This feature is an advantage over the conventional design using a transducer wherein the magnetic-field zero is fixed in position relative to that of the windings and the magnetic field is measured in a specific position, whereby the measurement will be affected by the gain. When, as in this embodiment of the invention, the magnetic field is made to track the zero point, gain variations are much attenuated because a change in gain proportionately affects both windings and consequently does not change the magnetic-field zero position.

Said position is determined not by the magnitudes of the drive currents, but by their ratio.

When the core 17 assumes a position wherein the winding 30 is coupled more with the winding 29 than with the winding 28, then more current is required in winding 28 than in winding 29 in order to generate a zero magnetic field at the center of the winding 30.

When the multiplexing switch 24 is in the position shown in FIG. 4, the desired configuration may be achieved because the output signal of the oscillator 1 is intrinsically always larger than that of M DAC 21.

However, when the core 17 is in a position coupling the winding 30 more to the winding 29 than to the winding 28, a larger current is required in winding 29 than in winding 28 to make the magnetic field zero at the center of the winding 30. Such a case is precluded from the arrangement of FIG. 4. To allow zero magnetic field for any position of the core 17, the control unit 23 analyzes the signal from the winding 30 and drives the multiplexing switch 24, thereby making possible a larger current in winding 29 than in winding 28.

In the third embodiment of the invention (FIG. 5), the windings 14, 15, 16 or 28, 29, 30 are replaced by printed circuits profiled as a square wave. The two circuits 25 and 26 are fixed in position.

Together with the sensor roller 6, the circuit 27 is movable and replaces both the central winding and the displaceable core of FIG. 4; it constitutes the position-detecting element of the sensor roller.

The three printed circuits, 25, 26, 27 evince the same spatial cycle. The circuits 25 and 26 are mutually offset by a quarter spatial cycle relative to the circuit 27. When the winding 25 is energized by a current of amplitude A, it generates a magnetic field in space described by $A \sin\theta$. Again when the winding 26 is energized by a current of amplitude B, it generates a magnetic field in space described by $B \cos \theta$.

In these formulas,
A is the current amplitude in the winding 25,
B is the current amplitude in the winding 26,
$\theta$ is the angular position in a 360° spatial cycle.
The magnetic field will be zero at an arbitrary point in a spatial cycle when $$A \sin\theta = B \cos\theta, \text{ i.e. } B/A = \tan \theta.$$

The procedure described relative to FIG. 4 is used to measure the relative positions of the rollers 5 and 6: the control unit 23 drives the counter 22 which in turn drives the M DAC 21 that varies the current in one winding until the output of the winding 27 is zero. At that time the counter reads $\tan\theta$.

The position $\theta$ in one spatial cycle is computed by the control unit 23.

The apparatus of the invention measures the thickness of a sheet/money-bill on the basis of differential digital values. Absent a sheet, the apparatus will measure by searching a zero signal at the transducer, and it will store the corresponding number N1.

Thereafter, when a sheet is present, the said apparatus proceeds in the same manner and stores a second number N2. The number corresponding to the sheet thickness is the difference N2−N1 and this difference also is stored for comparison in case there will be several superposed sheets. These numbers are stored in the sheet-thickness memory 7 (FIG. 1) of the digital transducer processing unit 4. The calculator of the sheet-issuing system 9 receives the numbers corresponding to the sheet thickness, for instance to count the number of issued sheets.

In the invention, the derived and stored numbers preferably shall be in binary form though they also may be in decimal form or evince another base.

I claim:

1. An apparatus for digitally measuring the thickness of sheets comprising:

a fixed roller;

a sensor roller biased toward the fixed roller;

a transducer with at least one input winding, at least one output winding, and an element coupled to, and sensitive to the position of, the sensor roller;

an oscillator for providing an input to a respective input winding of the transducer; and a digital processing unit coupled to at least one output winding of said transducer for providing a digital representation of sheet thickness based on the digital subtraction of two measurements, one measurement taken in the absence of a sheet and the other measurement taken in its presence.

2. An apparatus for digitally measuring the thickness of sheets, comprising:

a fixed roller;

a sensor roller biased toward the fixed roller;

a transducer with at least one input winding, at least one output winding, and an element coupled to, and sensitive to the position of, the sensor roller;

an oscillator for providing an input to a respective input winding of the transducer; and a digital processing unit coupled to at least one output winding of said transducer for providing a digital representation of sheet thickness based on the digital subtraction of two measurements, one measurement taken in the absence of a sheet and the other measurement taken in its presence, wherein the transducer comprises an input winding and two output windings and the digital processing unit comprises a microprocessor and two analogue-digital converters mounted between the microprocessor and respective each of the output windings.

3. An apparatus for digitally measuring the thickness of sheets, comprising:

a fixed roller;

a sensor roller biased toward the fixed roller;

a transducer with at least one input winding, at least one output winding, and an element coupled to, and sensitive to the position of, the sensor roller;

an oscillator for providing an input to a respective input winding of the transducer; and a digital processing unit coupled to at least one output winding of said transducer for providing a digital representation of sheet thickness based on the digital subtraction of two measurements, one measurement taken in the absence of a sheet and the other measurement taken in its presence, wherein the transducer comprises two input windings and one output winding, one of the input windings being energized directly and the other input winding being energized through a digital-analogue multiplier converter in a manner to cancel the output signal from the output winding.

4. Apparatus defined in claim 3, wherein the multiplier coefficient of the multiplier digital-analogue converter is between 0 and 1 and is adjusted by a counter driven by a control unit receiving the output signal of the output winding, a sum displayed by the counter being increased when the output signal is positive and being decreased when it is negative and being stopped when the output signal is zero.

5. Apparatus defined in claim 3, wherein the two input windings are energized through a multiplexer in order to exchange their feeds in order to obtain a zero output signal.

6. Apparatus defined in claim 3, wherein the two input windings and the output winding are printed circuits with a square waveform contour, said output winding constituting the sensitive element of the transducer.

7. Apparatus defined in claim 6, wherein the two printed circuits of the input windings are geometrically offset relative to the printed circuit of the output winding in such a way that they generate each a spatially sinusoidal magnetic field which are mutually offset by 90°.

8. Apparatus defined in claim 7, characterized in that the two input-winding printed circuits generate a magnetic field of which the amplitude is proportional to their energizing current.

9. Apparatus defined in claim 1, characterized in that the sheet-thickness thresholds are automatically determined by measuring the thickness of the sheets of a new cassette.

* * * * *